United States Patent
Dushane et al.

[19]

[11] Patent Number: 6,116,512
[45] Date of Patent: Sep. 12, 2000

[54] WIRELESS PROGRAMMABLE DIGITAL THERMOSTAT SYSTEM

[76] Inventors: Steven D. Dushane, 17170 Los Alimos St., Granada Hills, Calif. 91344; Grant E. Bohm, 15701 Ranchland Dr., Redding, Calif. 96001; John Staples, 6542 Horseshoe La., Huntington Beach, Calif. 92648

[21] Appl. No.: 08/802,640

[22] Filed: Feb. 19, 1997

[51] Int. Cl.⁷ .............................. G05D 23/00; F23N 5/20
[52] U.S. Cl. ............................................. 236/51; 165/238
[58] Field of Search ................. 236/46 R, 51 F; 165/238

[56] References Cited

U.S. PATENT DOCUMENTS

| | | | |
|---|---|---|---|
| 3,640,455 | 2/1972 | Romanelli ................................. | 236/49 |
| 4,071,745 | 1/1978 | Hall ....................................... | 236/46 R |
| 4,235,368 | 11/1980 | Neel ..................................... | 236/46 R |
| 4,258,877 | 3/1981 | White ...................................... | 236/49 |
| 4,406,397 | 9/1983 | Kamata et al. .......................... | 236/1 B |
| 4,585,163 | 4/1986 | Cooley et al. ........................... | 236/49 |
| 4,585,164 | 4/1986 | Butkovich et al. ....................... | 236/51 |
| 4,646,964 | 3/1987 | Parker et al. ........................... | 236/49 |
| 4,732,318 | 3/1988 | Osheroff ................................. | 236/49 |
| 4,819,714 | 4/1989 | Otsuka et al. ............................ | 165/12 |
| 4,886,110 | 12/1989 | Jackson ...................................... | 165/22 |
| 5,348,078 | 9/1994 | Dushane et al. .......................... | 165/22 |
| 5,449,319 | 9/1995 | Dushane et al. ........................ | 454/319 |
| 5,454,510 | 10/1995 | Manson et al. ......................... | 236/46 R |
| 5,513,796 | 5/1996 | Matsumoto et al. ....................... | 236/51 |
| 5,590,831 | 1/1997 | Manson et al. ............................ | 236/51 |
| 5,595,342 | 1/1997 | McNair et al. ...................... | 340/539 X |

FOREIGN PATENT DOCUMENTS

| | | | |
|---|---|---|---|
| 0079087 | 5/1983 | European Pat. Off. .................. | 236/51 |
| 2224863 | 5/1990 | United Kingdom ..................... | 62/231 |
| 2252846 | 8/1992 | United Kingdom ..................... | 236/51 |

Primary Examiner—William Wayner
Attorney, Agent, or Firm—Oppenheimer Wolff & Donnelly LLP

[57] ABSTRACT

A wireless programmable digital thermostat system includes multiple transmitter units and at least one receiver/controller unit. Each of the transmitter units is adapted to received programming inputs from users and to generate and transmit input signals over a wireless medium. The receiver unit is adapted to receive the input signals and to generate control signals in response to the input signals from only one of the transmitter units at a time. The receiver/controller unit receives and processes the input signals and is adapted to be programmable in response to the input signals according to a basic programming mode, and economy programming mode and an advanced programming mode.

12 Claims, 13 Drawing Sheets

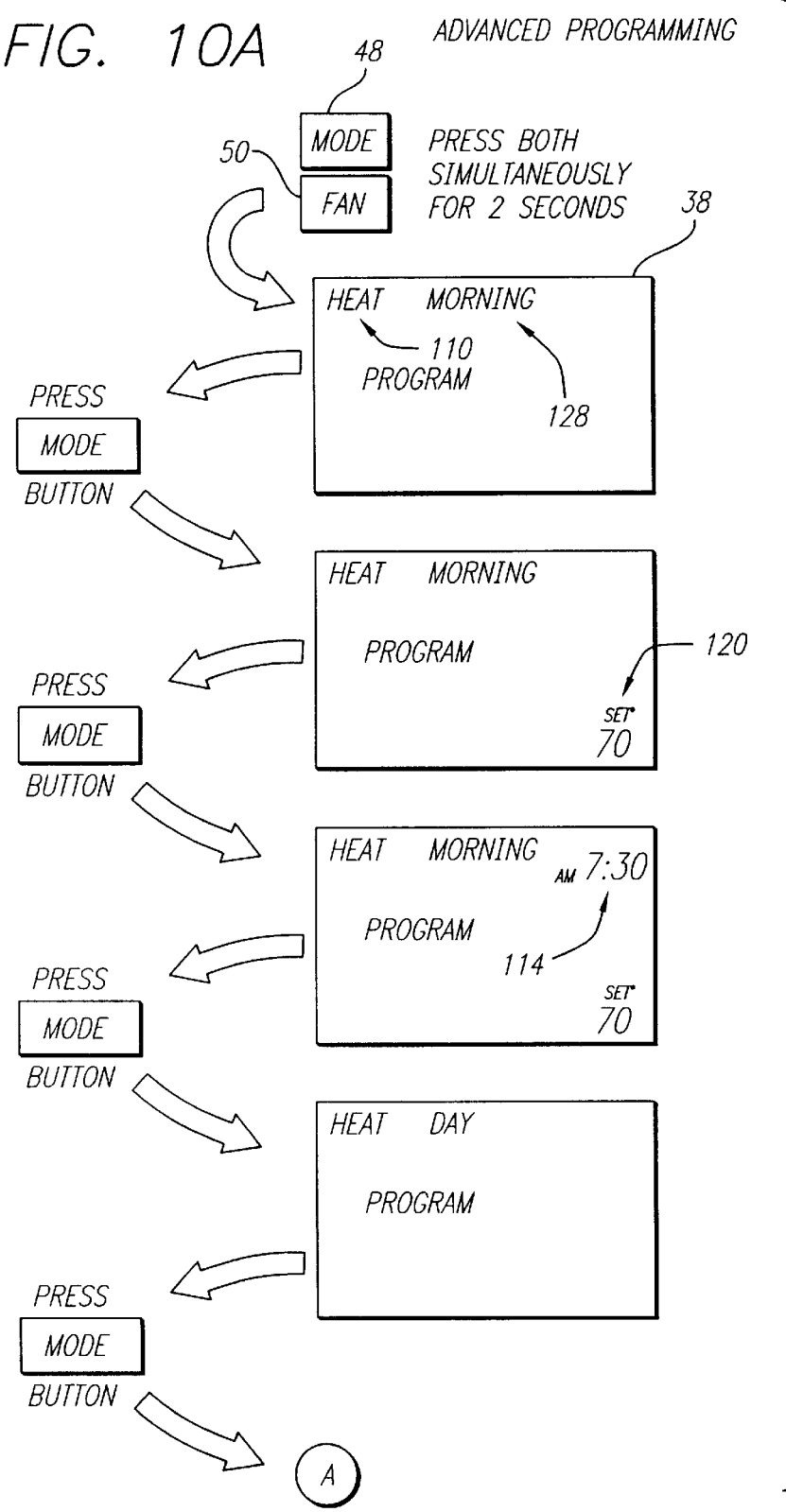

WIRELESS PROGRAMMABLE DIGITAL THERMOSTAT SYSTEM

BACKGROUND OF THE INVENTION

1. Field of the Invention

The present invention relates to a wireless programmable digital thermostat system and, more particularly, pertains to a thermostat system configured for remote programming pursuant to one of several programming modes of varying complexity.

2. Description of the Related Art

U.S. Pat. No. 5,348,078 to Duschane et al. discloses remotely controlling air conditioning, heating and a fan in different rooms via a master controller with a display screen and a control pad. The disclosed dwelling heating and air conditioning system includes a timer and may be set to turn on in a particular room at a selected time.

U.S. Pat. No. 4,819,714 to Otsuka et al. discloses a system for controlling temperatures in multiple rooms ("zone system") and includes set back and manual override features. The disclosed air conditioning apparatus includes a room controller facilitating user selection between stop, scheduled air-conditioning and manual air-conditioning operating modes.

U.S. Pat. No. 4,886,110 to Jackson discloses a heating, venting, air conditioning (HVAC) system in which a microprocessor controls the number of stages of heating or cooling which are energized in dependence on the difference between the number of zone thermostats calling for heating and the number calling for cooling.

However, the art is still devoid of a thermostat system including multiple transmitter units and at least one receiver/controller unit with each of the transmitter units being adapted to receive programming inputs from users and to generate and transmit input signals over a wireless medium and the receiver unit being adapted to receive the input signals and to generate control signals in response to the input signals from only one of the transmitter units. Furthermore, no known thermostat system includes a receiver/controller unit which receives and processes such input signals and which is adapted to be programmable in response to the input signals according to a plurality of programming modes of varying complexity. Thus, an object of the present invention is to provide a wireless programmable digital thermostat system embodying these features.

SUMMARY OF THE INVENTION

In accordance with a specific illustrative embodiment of the present invention, a wireless programmable digital thermostat system includes a plurality of portable, hand-held transmitter units and a receiver unit. Each of the transmitter units is adapted to transmit input signals over a wireless communication medium. Each of the transmitters includes a user input mechanism adapted to receive programming inputs from users of the transmitter units. Each of the transmitters is adapted to generate the input signals in response to the programming inputs. Each of the transmitters includes a display adapted to display indicia of the programming inputs. The receiver unit is for a thermostat which includes a plurality of environmental control apparatuses and includes a controller adapted to be programmable in response to the input signals according to a plurality of programming modes and to generate and provide control signals to the environmental control apparatuses. The controller is adapted to facilitate automatic adjustments in control variables associated with at least one of the programming modes. The controller is adapted to process the input signals to identify a transmitter unit which has most recently received a programming input and to control the thermostat system only in response to input signals received from the transmitter unit which has most recently received a programming input.

In another aspect of the present invention, a wireless programmable digital thermostat system includes a controller unit for a thermostat system which includes a plurality of environmental control apparatuses. The controller unit is adapted to be remotely programmable according to a plurality of programming modes of varying complexity and to generate and provide control signals to the environmental control apparatuses.

In another aspect of the present invention, a wireless programmable digital thermostat system includes: a plurality of transmitter units adapted to transmit input signals over a wireless communications medium; and a receiver unit adapted to receive the input signals and to control a thermostat system in response to input signals from only one of the transmitter units.

DESCRIPTION OF THE DRAWINGS

Other objects, features and advantages of the invention will become readily apparent upon reference to the following detailed description when considered in conjunction with the accompanying drawings, in which like reference numerals designate like parts throughout the figures thereof, and wherein:

FIGS. 10A–10C show the display portion of the transmitter unit during execution of an advanced programming mode software module.

DETAILED DESCRIPTION OF THE PREFERRED EMBODIMENTS

Figure 1:
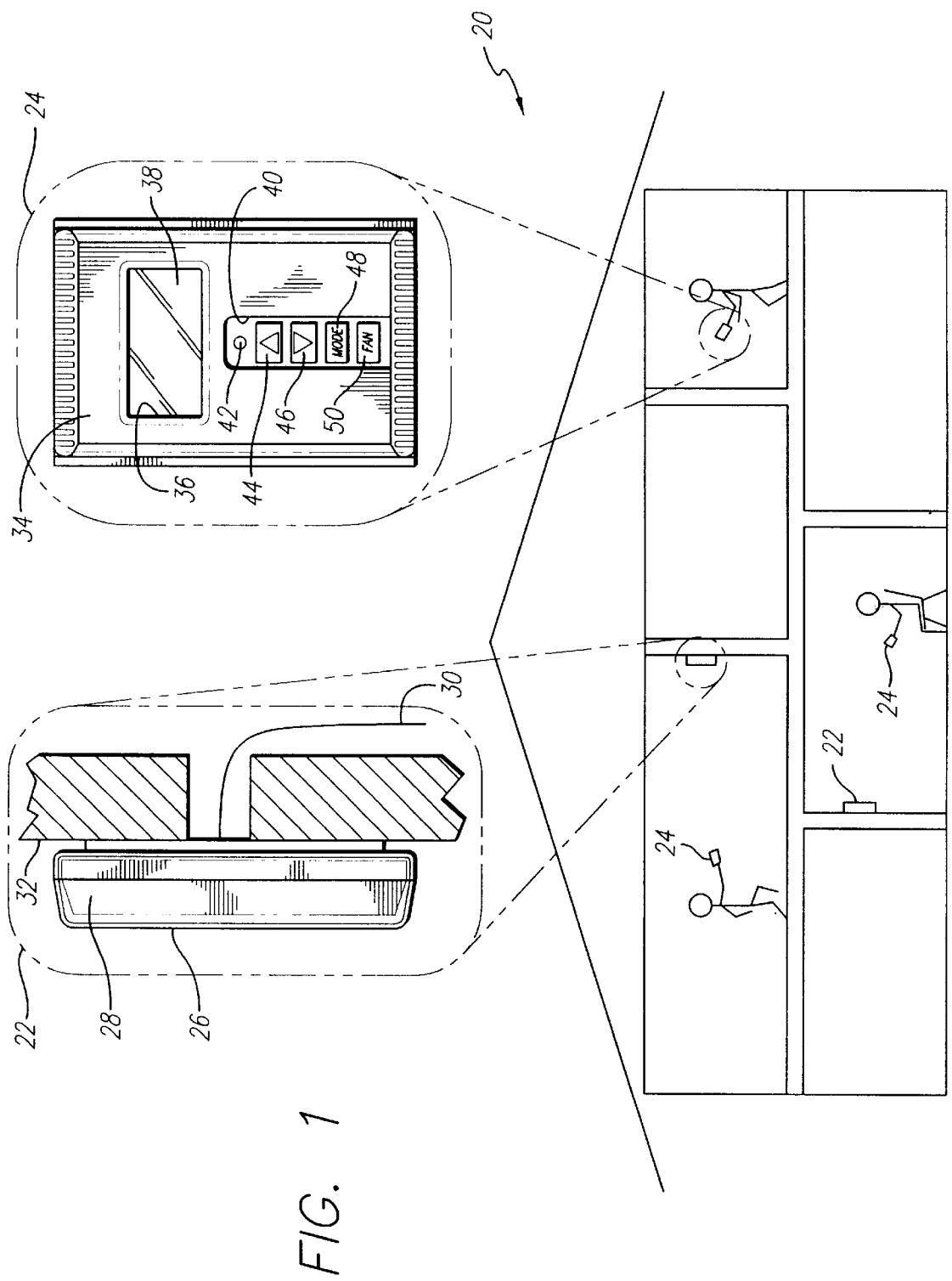
FIG. 1 is cross-sectional perspective view of a house showing two receiver/controller units attached to walls in different areas of the house and three people each holding a transmitter unit according an exemplary embodiment of the present invention.

As shown in FIG. 1, an exemplary wireless programmable digital thermostat system 20 includes at least one receiver/controller unit 22 and a plurality of transmitter units 24.

Each receiver/controller unit 22 includes a housing 26 formed, for example, from a light-weight plastic. The receiver/controller unit 22 also includes receiver/controller electronics 28 which are fitted within the housing 26. The receiver/controller unit 22 further includes an antenna 30 and is preferably, but not necessarily, mounted to a wall 32 as shown with the antenna 30 concealed from view. At least one receiver/controller unit 22 is required for each HVAC being controlled or for each region (e.g., room within a residential dwelling) where an environmental characteristic (e.g., temperature) is to be monitored. It should be appreciated that the principles of the present invention are also applicable to a "zone system" where it is desirable to independently regulate the respective temperatures in different regions of a dwelling, commercial property or other building. Although the disclosed exemplary system 20 monitors and controls temperature, the subject matter of the present invention additionally contemplates a system where other environmental characteristics such as humidity, noise level, the presence of radioactive materials, etc. are monitored and, to the extent practicable, remotely controlled.

The transmitter unit 24 shown in FIG. 1 includes a portable, hand-held transmitter housing 34 which is preferably formed from a light-weight plastic material. The transmitter housing 34 includes an aperture 36 formed on the front side thereof as shown. The transmitter unit 24 includes a display 38 which is visible through the aperture 36. The display 38 comprises, for example, a liquid crystal display with a Thermoglow™ backlight. The transmitter housing 34 additionally includes a recessed edge 40 which provides an open channel on the front side of the transmitter housing 34. The transmitter unit 24 additionally includes a plurality of user input mechanisms which, in the exemplary illustrated embodiment, comprise an indicator light 42, an up button 44, a down button 46, a mode button 48 and a fan button 50. The interactive remote programming aspects of the present invention are implemented via the aforementioned user input mechanisms and are described below in greater detail.

Figures 1, 2:
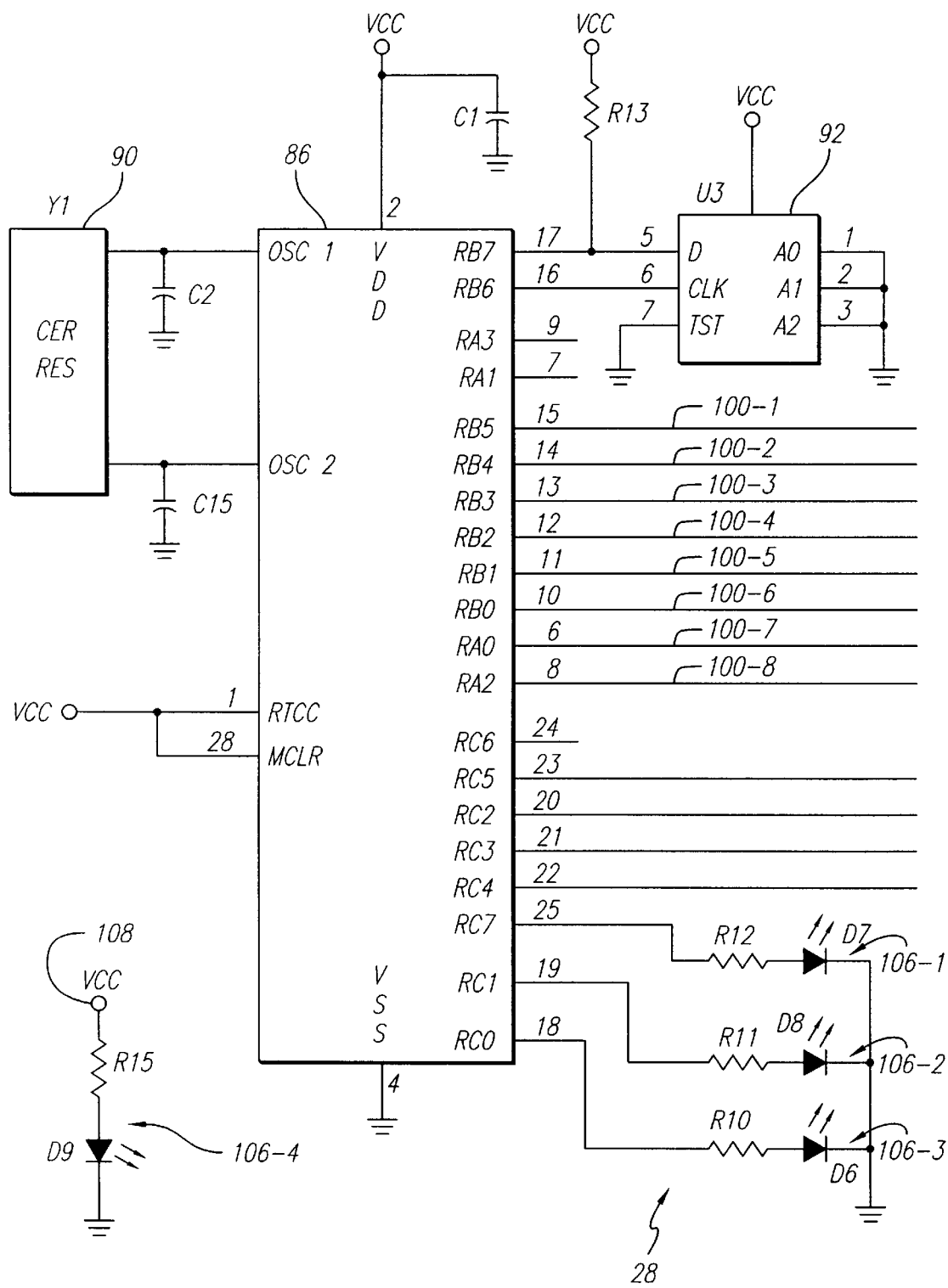
FIG. 2 is an electrical schematic of the receiver/controller unit of FIG. 1.
Figure 2:
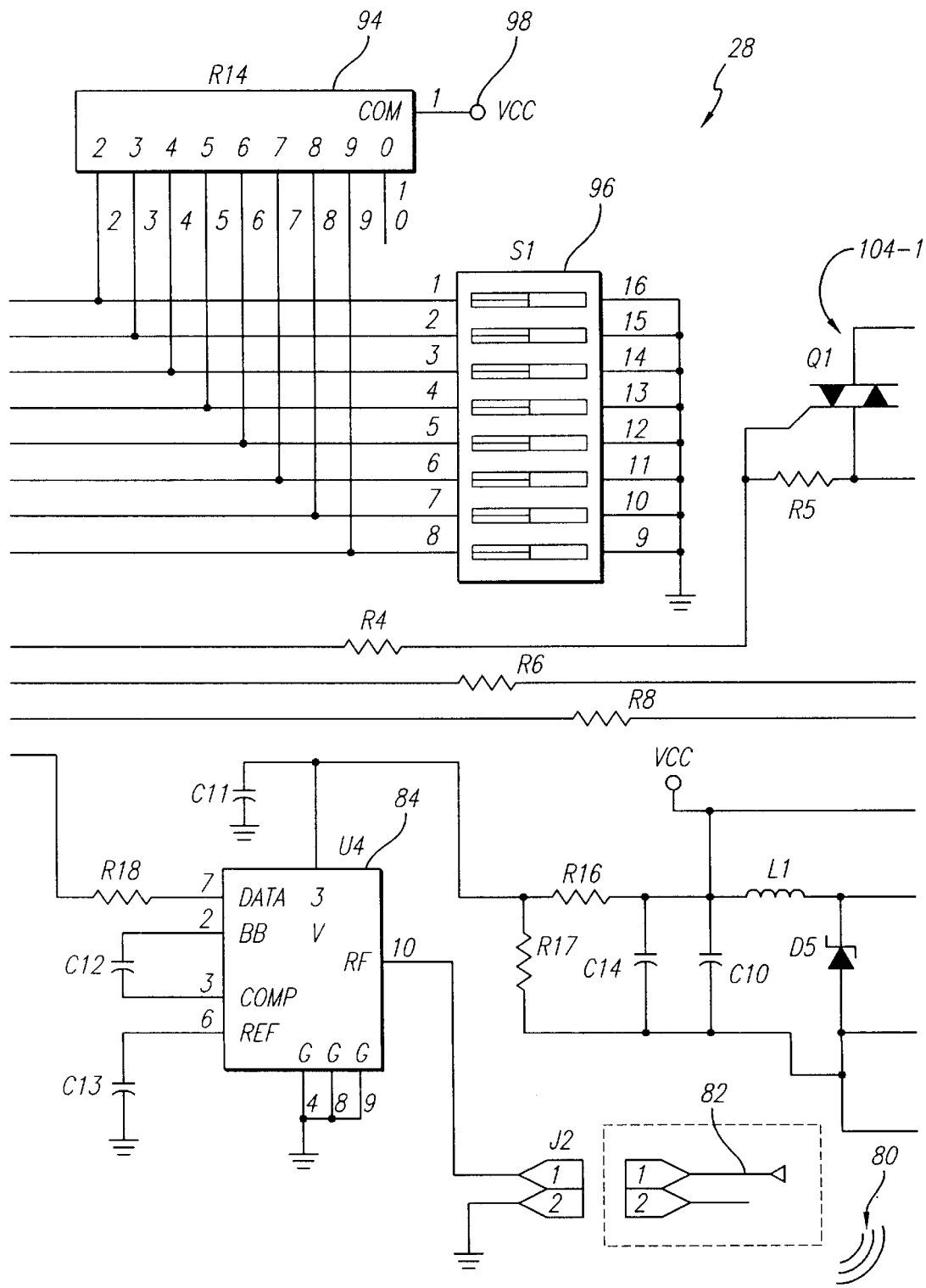
Figures 2, 3:
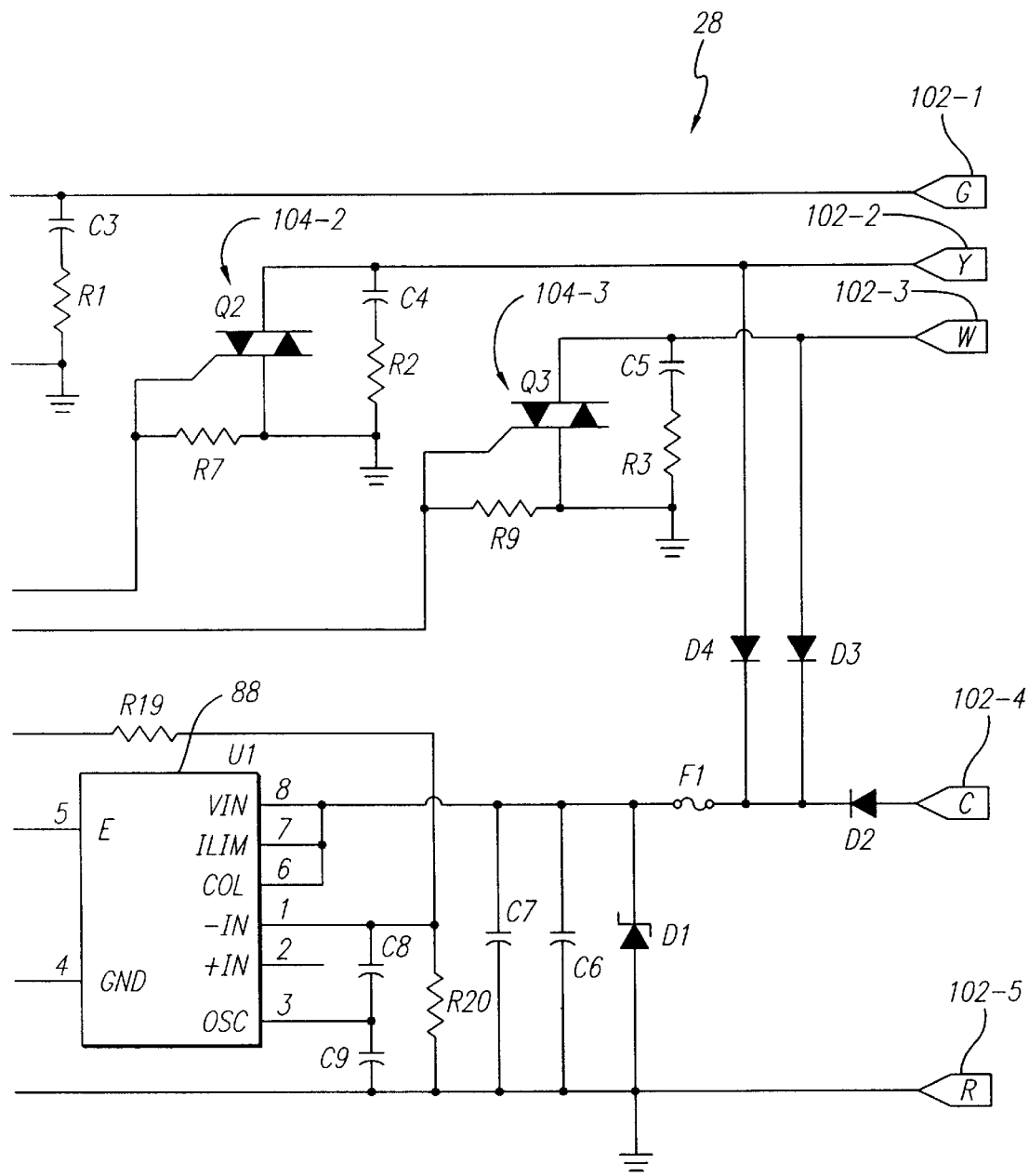
FIG. 3 is an electrical schematic of the transmitter unit of FIG. 1.
Figures 1, 3:
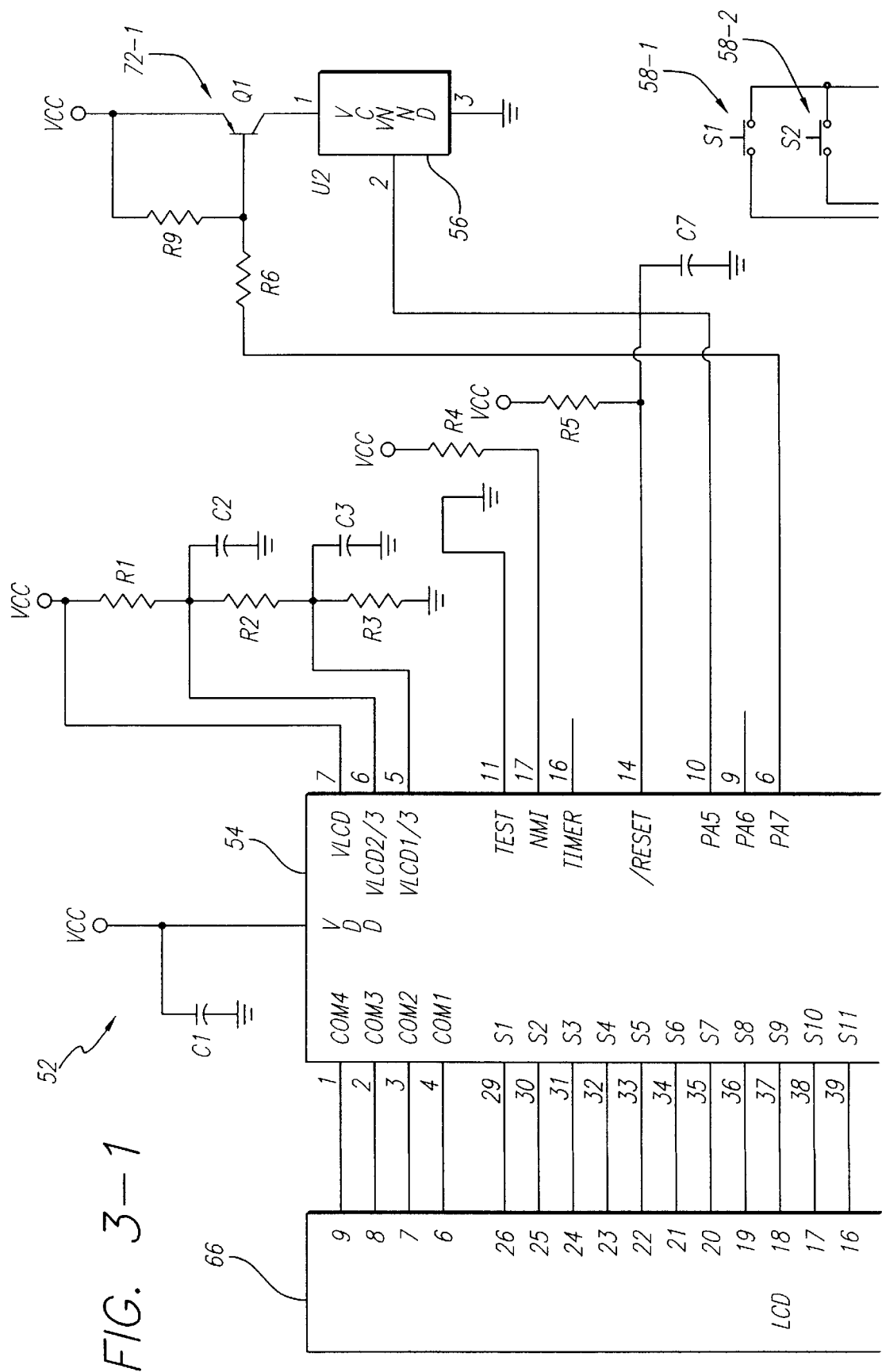
Figures 2, 3:
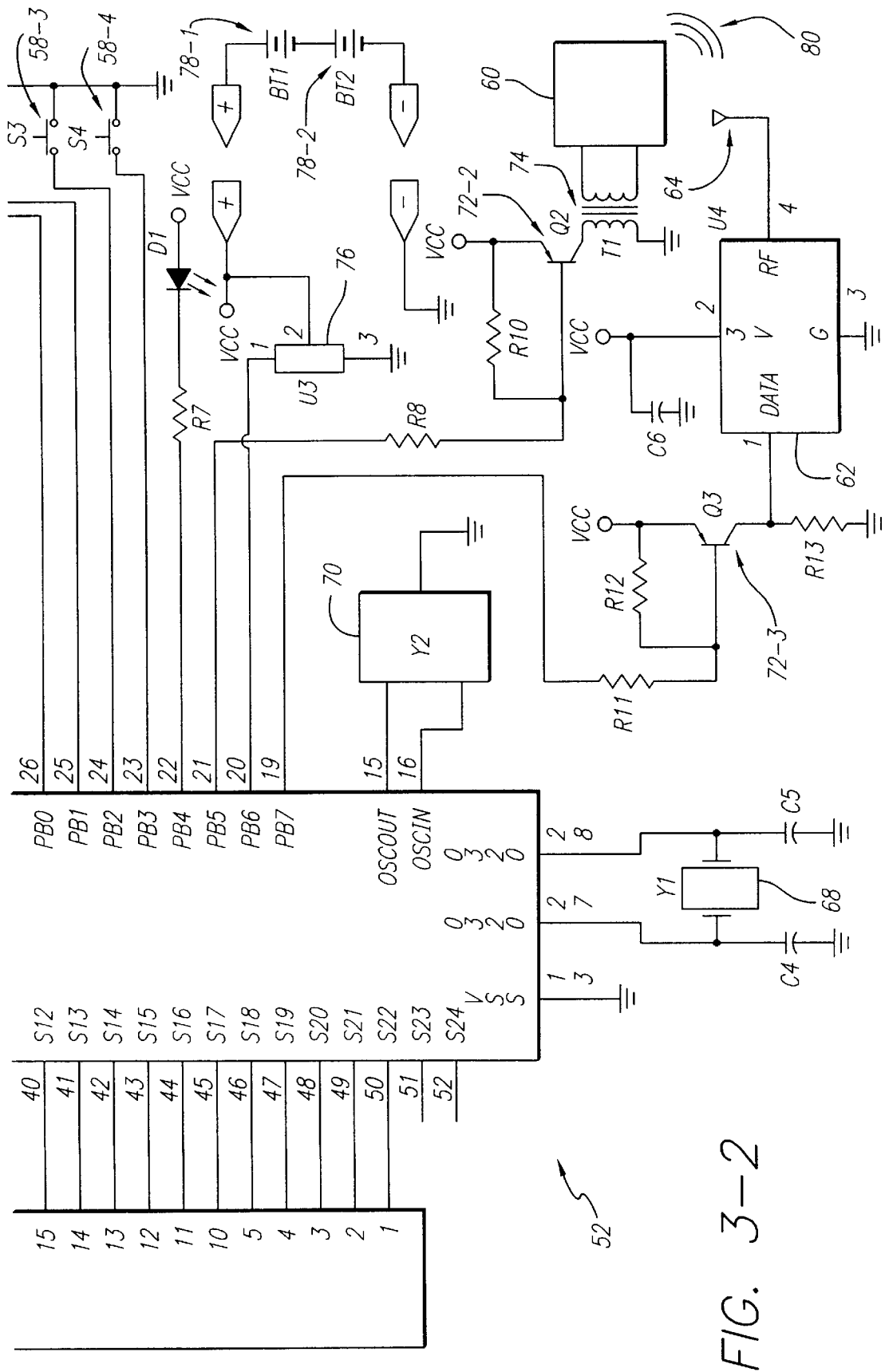

Each transmitter unit 24 includes transmitter unit electronics 52 which are shown in schematic form in FIG. 3. Generally, the transmitter unit electronics 52 receive and process user inputs to generate input signals. Some of the input signals are transmitted and others are supplied to the display 38. The user inputs, as determined by actuations of the user input mechanisms, are provided to the transmitter unit electronics 52. The user inputs may also be provided wirelessly in wireless zoning.

The transmitter unit electronics 52 comprise a microprocessor 54, a temperature sensor 56, switches 58-1, 58-2, 58-3, 58-4, a lamp 60, a transmitter 62 and an antenna 64. An exemplary microprocessor 54 is the ST6245 manufactured by SGS Thompson. The display 38 includes a liquid crystal display (LCD) 66 which is electrically connected to the microprocessor 54 as shown. A crystal 68 and a ceramic resonator 70 are also electrically connected to the microprocessor 54 as shown. The crystal 68 preferably operates at 32.768 kHz and the ceramic resonator preferably resonates at 2.00 MHz. As may be readily appreciated, other timing or clocking schemes can be employed. The microprocessor 54 is also electrically connected to the temperature sensor 56 via a transistor 72-1 which, for example, comprises a 2N2907A transistor. The lamp 60 is electrically connected to the microprocessor 54 via a similar transistor 72-2 and a transformer 74 as shown. The transmitter 62 is connected to the microprocessor 54 via a transistor 72-3. The transmitter electronics 52 additionally include a voltage detector 76 connected to the microprocessor 54 as shown. The temperature sensor 54, transmitter 62 and voltage detector 76 respectively comprise, for example, an AD22103KT temperature sensor manufactured by Analog Devices, an HX-1003-1 transmitter manufactured by RF Monolithics and a TC54VC2902ECB voltage detector manufactured by Telcom. An exemplary LCD 66 comprises a BT-142ZAS manufactured by PICVUE.

The switches 58-1, 58-2, 58-3, 58-4 are mechanically connected to the fan button 50, mode button 48, down button 46 and up button 44, respectively. Although the preferred buttons 44, 46, 48, 50 comprise rubber buttons with carbon switching materials, other user input mechanisms can be employed. For example, the transmitter unit 24 could be modified to receive wireless, optical, voice or other user inputs facilitating the desired switching at the input ports of the microprocessor 54. In the illustrated preferred embodiment, power is provided to the microprocessor 54 by batteries 78-1, 78-2 which comprise, for example, 1.5 volt, AA cell batteries electrically connected via the voltage detector 76 as shown.

The receiver/controller electronics 28 are schematically illustrated in FIG. 2. Generally, the receiver/controller electronics 28 receive and process the input signals to generate control signals which are provided to environmental control apparatuses. The receiver/controller electronics 28 include a receiver antenna 82 which is preferably shielded as shown. The aforementioned input signals are transmitted by the transmitter unit 24 at the transmitter antenna 64 (FIG. 3), travel through a wireless communications medium 80 (e.g., air), and are received by the receiver antenna 82 (FIG. 2).

The receiver/controller electronics 28 further comprise a receiver 84, a controller 86 and a switching regulator 88 which comprise, for example, an RX1300 receiver manufactured by RF Monolithics, a PIC15C57A microprocessor and an LM3578A switching regulator, respectively. The receiver/controller electronics 28 additionally include a ceramic resonator 90 and an integrated circuit 92 electrically connected to the controller 86 as shown to provide clock and timing inputs. The ceramic resonator 90 is preferably selected to resonate at 4.00 MHz. The integrated circuit 92 preferably comprises a 24LC01 integrated circuit connected to the controller 86 as shown.

The receiver/controller electronics 28 additionally include a resistor network 94 and a switch network 96. Each resistor of the resistor network 94 is connected between a voltage source 98 and input lines 100 of the controller 86. In the illustrated preferred embodiment, input lines 100-1, 100-2, 100-3, 100-4, 100-5, 100-6 provide a code to the controller 86. The code is preferably unique to a particular region (e.g., an entire house, a group of floors in a building, a single floor in a building, several rooms, a single room, etc.) to be controlled. A key aspect of the present invention is that the transmitted input signals include data bits which must correspond to the code of the receiver/controller unit 22; otherwise, the controller 86 will not respond to the received input signals. Thus, numerous transmitter units 24 may be employed to control the environmental characteristics in one or several regions, with each region including its own unique code as established via manipulation of the switch networks 96 of the receiver/controller units 22 within each region.

The input lines 100-7, 100-8 also provide data bits to the controller 86 as determined by how the individual switches of the switch network 96 are set. These additional input lines 100-7, 100-8 provide inputs which allow a user to customize system operation.

A thermostat system 20 may include various combinations of environmental control apparatuses selected from a group comprising, for example, a heater, an air conditioning unit, a fan and heat pump. In the illustrated embodiment, the controller 86 is programmed to expect an electric heat data bit at input line 100-7 and a heat pump data bit at input line 100-8. In a thermostat system 20 including an electric heater and a fan, the data bit at input line 100-7 is set such that the fan turns on instantly when heat is called for. In a thermostat system 20 including a single stage heat pump, the data bit at input line 100-8 is set such that the control signals generated by the controller 86 are appropriately modified to accommodate a fan, compressor and reversing valve. Thus, another aspect of the present invention is the configurability of the thermostat system 20. It should be appreciated that the thermostat system 20 can be modified to control additional and/or other apparatuses and devices such as a two-stage heat pump.

It should also be appreciated that the input lines 100 can be alternatively employed to provide an operating mode overriding mechanism for providing a mode override signal to the receiver/controller unit 22. Exemplary operating modes for the thermostat system 20 are discussed below in greater detail.

As shown in FIG. 2, the receiver/controller electronics 28 also include control signal terminals 102 which are electrically connected to the environmental control apparatuses mentioned above. More specifically, the terminal 102-1 (designated "G") provides a fan control signal. The terminal 102-2 (designated "Y") provides a cooling control signal. The terminal 102-3 (designated "W") provides a heating control signal. The terminal 102-4 (designated "C") provides a common or ground connection. The terminal 102-5 (designated "R") provides a valve reverse control signal. The scope of the present invention also includes the provision of additional or different control signal terminals depending upon the nature of the apparatuses or devices to be controlled.

The receiver/controller electronics 28 preferably include protection circuitry designed in consideration of the interface between the controller 86 and the devices to be controlled thereby. Such protection circuitry includes the switching regulator 88 as well as the discrete circuit elements shown in FIG. 2 which include, but are not limited to, triacs 104-1, 104-2, 104-3. The receiver/controller electronics 28 may also include a plurality of control LEDs 106 which are electrically connected to the controller 86 and are selectively energized by outputs of the controller depending upon which apparatuses are being controlled and how. For example, the controller 86 can be programmed to selectively control the illumination of a heat control LED 106-1, a cool control LED 106-2, a fan control LED 106-3 and a power on LED 106-4. The receiver/controller electronics 28 are preferably powered by a power source (VCC) 108 derived from whatever alternating-current power source (e.g., 110 VAC) is available at the region to be controlled. The receiver/controller electronics 28 may also include batteries as an alternative or supplemental power source.

Figure 4:
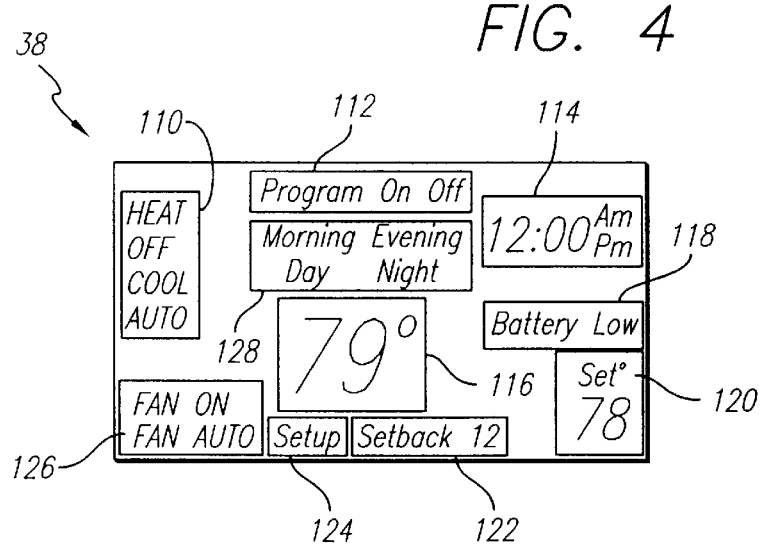
FIG. 4 shows a display portion of the transmitter unit of FIG. 1 and particularly illustrates an exemplary configuration of display fields.

FIG. 4 illustrates an exemplary configuration of display fields within the display 38. Each display field preferably, but does not necessarily, occupy a predetermined portion of the display 38. Stated otherwise, the display 38 is preferably partitioned into non-overlapping portions which are each dedicated to providing a predetermined visual indicia of a user programming input or a monitored environmental condition of interest. In so partitioning the display 38, portions of the LCD 66 are selectively activated by the microprocessor 54 of the transmitter unit 24.

In the exemplary illustrated embodiment, the display fields include a mode indication display field 110 which includes "HEAT", "OFF", "COOL" and "AUTO" sub-fields. One of the aforementioned sub-fields is activated depending upon which operating mode for the controlled apparatuses is selected. When the sub-field "HEAT" is activated, this provides the user with a visible indication that a heating operation has been selected. When the sub-field "COOL" is activated, the user is provided with a visible indication that a cooling operation has been selected. When illuminated, the sub-field "AUTO" provides an indication that the system will automatically changeover between heat and cool modes as the temperature varies. When the sub-field "OFF" is activated, this indicates that the entire system is turned off.

The plurality of display fields also include a program indication display field 112 which indicates the status of a stored timer program, the operation of which is described below in greater detail. When the sub-fields "Program" and "On" are both activated, this provides the user with an indication that stored programming is currently being executed. When the sub-fields "Program" and "Off" are both activated, the stored timer programming is not currently being executed.

Various data and/or monitored environmental conditions of interest are also presented in the form of visible indicia. Thus, the exemplary illustrated display 38 further comprises a clock display field 114 with "[hours]:[minutes]", "Am" and "Pm" sub-fields as shown in FIG. 4. The display fields also include a temperature display field 116 and a battery low indication display field 118. The clock display field 114 preferably shows the current time and is used to program the timer periods as discussed below with reference to the user programming aspects of the present invention. The temperature display field 116 shows the current temperature as measured by the temperature sensor 56.

The disclosed system 20 is economically designed in contemplation of a scenario where one or several persons within a specific controlled environment are each given a transmitter unit 24. When one of the transmitter bearing persons becomes uncomfortable or, for whatever other reason, desires to change the temperature within the controlled environment, a transmitter unit 24 is employed. Provided the receiver/controller unit 22 is within receiving range of the transmitted input signals generated by the employed transmitter unit 24, the person in possession of the transmitting transmitter unit 24 need not be within the environment controlled by the receiver/controller unit 22. For example, a person may be on the way home from work and desire to warm up the house prior to arrival. Additionally, the system 20 can be modified such that data indicative of conditions of interest in a particular region are telemetrically provided to the transmitter unit 24 as well as presented to the user in the form of visual indicia via the display 38.

As shown in FIG. 4, a desired set temperature display field 120 within the display 38 provides a visible indication of the desired temperature set by a user of the system 20. The displays fields also include a setback indication display field 122, a setup indication display field 124, a fan operation indication display field 126 and a timer period indication display field 128. The setback indication display field 122 includes sub-fields "Setback", "1" and "2" and indicates features pertaining to setback programming which is discussed below with reference to FIG. 8. The setup indication display field 124 includes a "Setup" sub-field and is discussed below with reference to FIGS. 5 and 9. The fan operation indication display field 126 includes "FAN ON" and "FAN AUTO" sub-fields and is discussed below with reference to FIG. 7. The timer period indication display field 128 includes "Morning", "Day", "Evening" and "Night" sub-fields and is discussed below with reference to FIGS. 10A–10C.

A key aspect of the present invention is that each person with a transmitter unit 24 has the ability to remotely program or control the receiver/controller unit 22. More specifically, a program executed by the microprocessor 54 provides an interactive programming interface which facilitates remote programming according to a plurality of programming modes of varying complexity. In a preferred embodiment, the plurality of programming modes comprise a basic programming mode, an economy programming mode and an advanced programming mode. Although all of the aforementioned programming modes may be implemented within a single computer executable program stored within or accessible to the microprocessor 54, they (and other executable program features) will hereinafter be referred to as "modules". Furthermore, it should be understood that each of the programming and/or control features described below can be implemented as a separate computer executable program, combined into several executable programs, or combined into a single executable program. It is contemplated that the transmitter unit 24 can also include an input port to facilitate uploading revised or updated versions of the executable program(s).

Another key aspect of thermostat system 20 is that the controller 86 is preferably programmed to process the input signals received from the plurality of transmitter units 24 to identify the transmitter unit 24 which has most recently received a programming input from a user. A preferred controller 86 is also programmed to control the environmental control apparatuses only in response to the input signals received from the transmitter unit 24 which has most recently received a programming input. Furthermore, the transmitted input signals include data bits which uniquely identify the transmitter unit 24 from which they originate so that the preferred controller 86 can be programmed to only respond to input signals from particular transmitter units 24.

Figure 5:
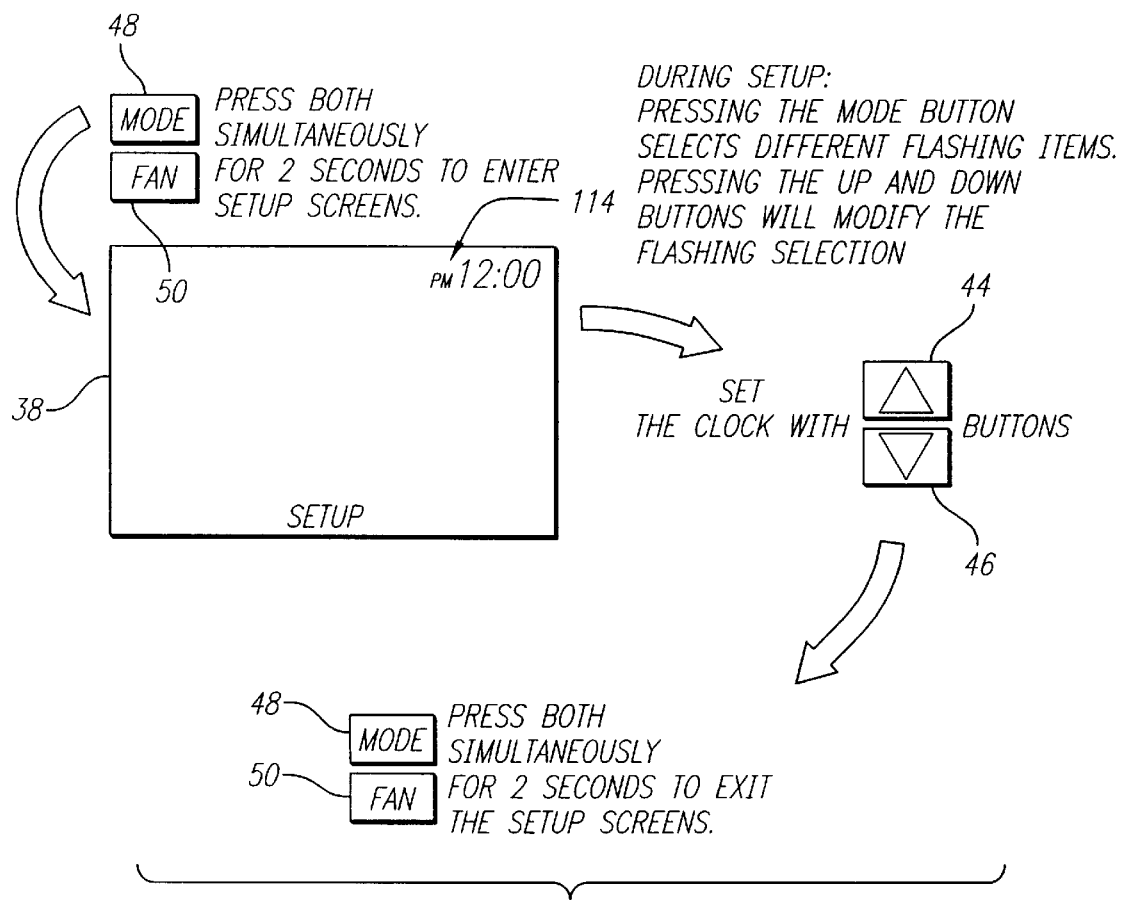
FIG. 5 shows the display portion of the transmitter unit during execution of a quick start software module.

FIG. 5 shows the display 38 of the transmitter unit 24 during execution of a quick start software module by the microprocessor 54. Execution of the quick start software module begins when a user of the transmitter unit 24 presses both the mode button 48 and the fan button 50 simultaneously for some predetermined duration of time, e.g., two seconds. The clock display field 114 is first activated and, in the preferred embodiment, flashes while the time is being set up until the mode button 48 is pressed again indicating that the user wishes to enter the set time. The up button 44 and the down button 46 are selectively pressed to adjust the time in predetermined time increments such as 30 minute increments. It is further contemplated that the quick start software module may be modified such that the speed of transition from one time increment to the next differs depending upon how long either of the buttons 44, 46 is depressed. The transmitter unit 24 interactively prompts the user to provide other user inputs pursuant to a basic programming mode as discussed below with reference to FIG. 6. After these user inputs are entered, the user exits the setup screens by, for example, continuously pressing both the mode button 48 and the fan button 50 for two seconds.

Figure 6:
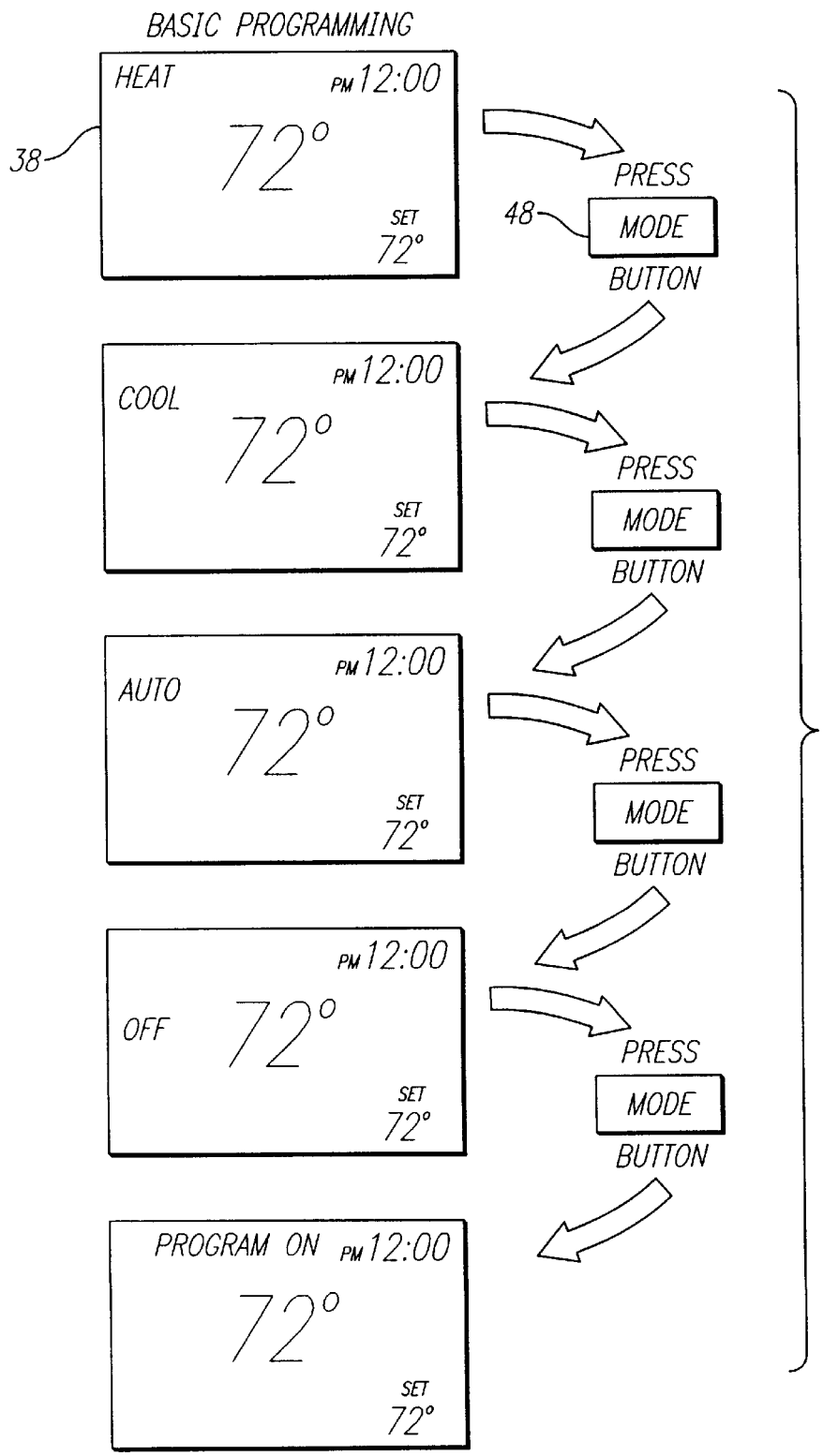
FIG. 6 shows the display portion of the transmitter unit during execution of a basic programming mode software module.

FIG. 6 shows the display 38 of the transmitter unit 24 during execution of a basic programming mode software module by the microprocessor 54. During execution of the basic programming mode software module, the up button 44 and the down button 46 are employed to set a desired temperature for a particular operating mode (to be distinguished from programming mode). The operating modes include a HEAT mode, a COOL mode, an AUTO mode and an OFF mode. During the HEAT mode, the microprocessor 54 generates and controls the transmission of input signals which are received by the receiver/controller unit 22 which processes the input signals to generate control signals which are, in turn, provided to a heating apparatus such as a furnace. During the COOL mode, the receiver/controller unit 22 provides the control signals to a cooling apparatus such as an air conditioner. During the AUTO mode, control signals are automatically provided to both a heating apparatus and a cooling apparatus depending upon the desired temperature set by the user and a measured temperature in the environment to be controlled. The present invention additionally contemplates program modifications to facilitate temperature sampling enhancements, averaging, etc.

Transitions between the aforementioned operating modes are controlled by pressing the mode button 48. Once a desired operating mode has been selected and a desired temperature entered via appropriate manipulation of the up and down buttons 44, 46, the user exits from the setup screens by simultaneously pressing the mode button 48 and the fan button 50 as discussed above with regard to FIG. 5. The bottom portion of FIG. 6 shows that the mode button 48 is also employed to initiate execution of stored four time period operation, an advanced programming mode feature which is described below in greater detail with reference to FIGS. 10A–10C.

Figure 7:
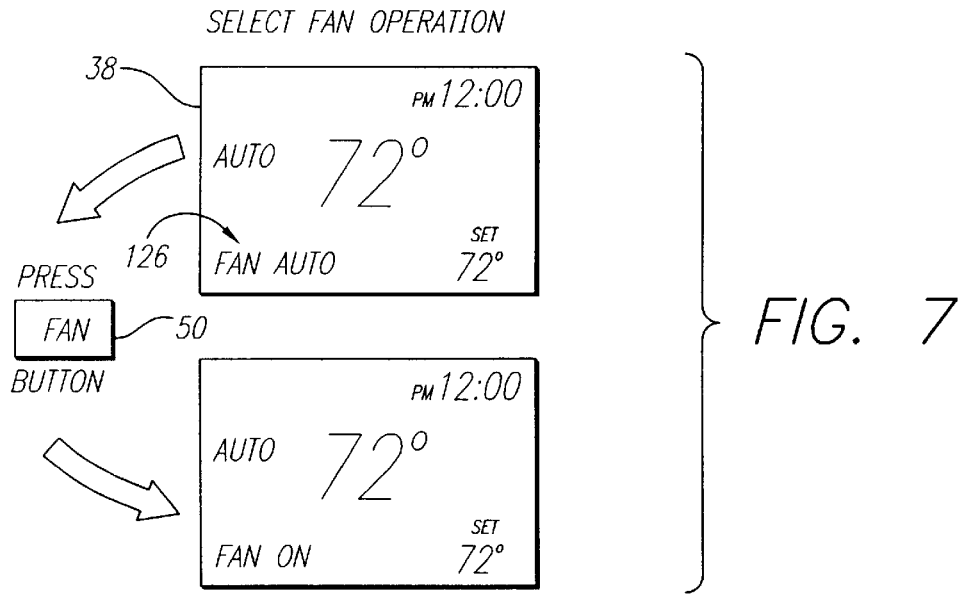
FIG. 7 shows the display portion of the transmitter unit during execution of a fan operation control software module.

FIG. 7 shows the display 38 of the transmitter unit 24 during execution of a fan operation control software module by the microprocessor 54. Execution of the fan operation control software module begins when a user of the transmitter unit 24 presses the fan button 50 for a predetermined period of time thereby activating the fan operation indication display field 126. As shown in FIG. 7, a user may alternatively select between one of two different fan operating modes by employing the fan button 50. The fan operating modes include a FAN AUTO mode and a FAN ON mode. The microprocessor 54 generates and controls the transmission of input signals which vary depending upon which fan operating mode is selected. The receiver/controller unit 22 receives and processes the input signals to generate control signals which are, in turn, provided to a fan or similar apparatus. When the FAN AUTO mode is selected, the fan turns on only when there is a demand for heating or cooling. When the FAN ON mode is selected, the fan runs continuously.

Figure 8:
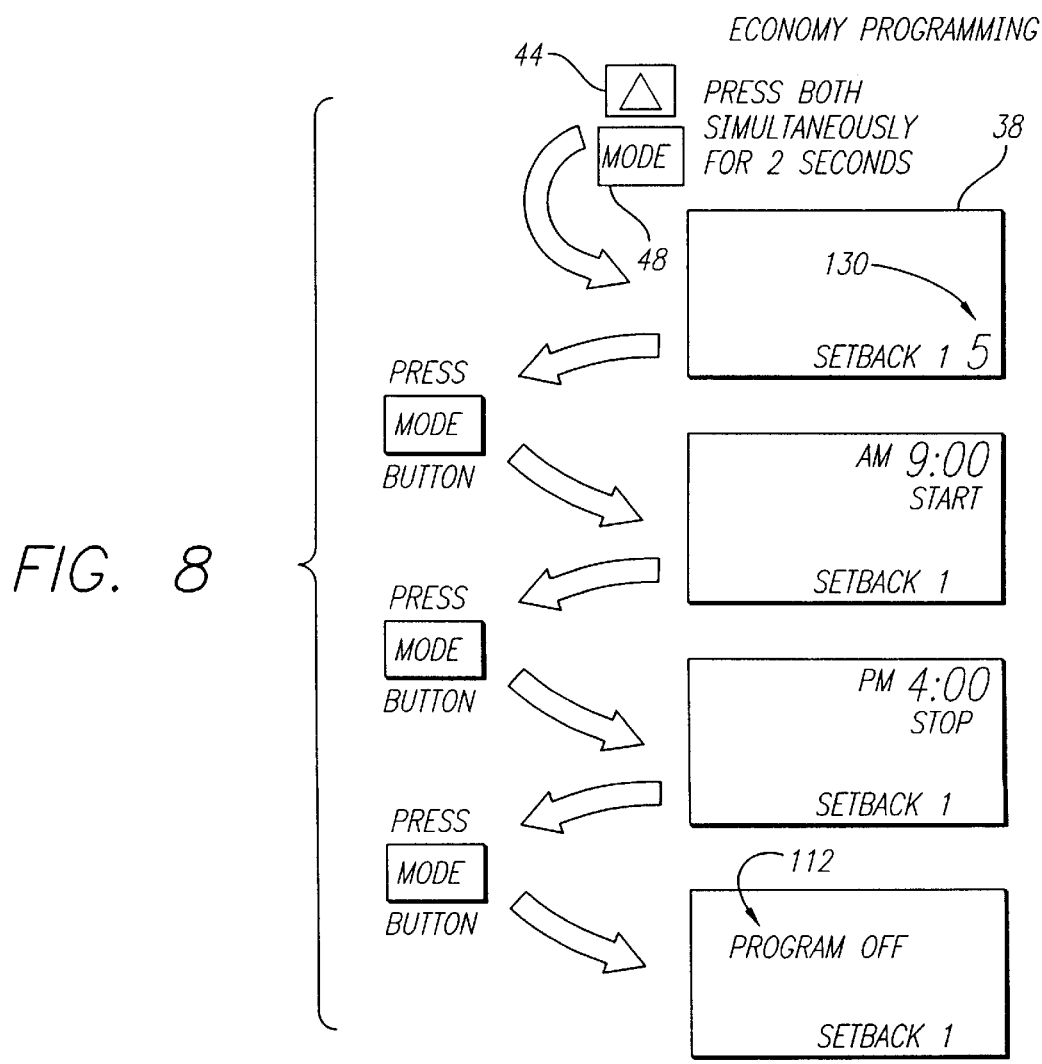
FIG. 8 shows the display portion of the transmitter unit during execution of an economy programming mode software module.

FIG. 8 shows the display 38 of the transmitter unit 24 during execution of an economy programming mode software module by the microprocessor 54. The preferred controller 86 at the receiver/controller unit 22 is programmed to operate according to two setback protocols which are designed to save energy. More specifically, the setback protocols are used during times when climate control adjustments are less frequently needed such as during sleep and away periods. The precise nature of these setback protocols is determined by the user who employs the economy programming mode software module to remotely establish the setback protocols. In a preferred thermostat system 20, the setback protocols can only be activated when the operating mode is HEAT, COOL or AUTO.

FIG. 8 illustrates how a first setback protocol (designated "Setback 1") is established. A user initiates execution of the economy programming mode software module by simultaneously pressing the up button 44 and the mode button 48 for a predetermined amount of time. The user then uses the up and down buttons 44, 46 to select one of a predetermined group of temperature offsets (e.g., 5, 10, 15 or 20 degrees Fahrenheit) which is displayed at an offset temperature display field 130. During economy operation, a furnace or air conditioner will not turn on until the room temperature reaches the set temperature plus or minus the offset temperature. Once the desired offset temperature is selected, the mode button 48 is pressed to advance to the next two economy programming steps where start and stop times for the first setback protocol are similarly selected. A second setback protocol is established in identical fashion.

As illustrated at the bottom of FIG. 8, the program indication display field 112 provides an indication of whether or not a particular setback protocol is turned on. As with the other user inputs, the up and down buttons 44, 46 are employed to toggle the setback protocols between on and off operating statuses. When a user has finished programming the setback protocols, normal operation is resumed by simultaneously pressing the up button 44 and the mode button 48 for a predetermined amount of time. Conversely, economy programming can be turned on during normal operation by holding down the fan button 50 while pressing the up button 44. As may be readily appreciated, the microprocessor 54 can be programmed to respond in the same manner to different combinations of actuated user input mechanisms.

Figure 9:
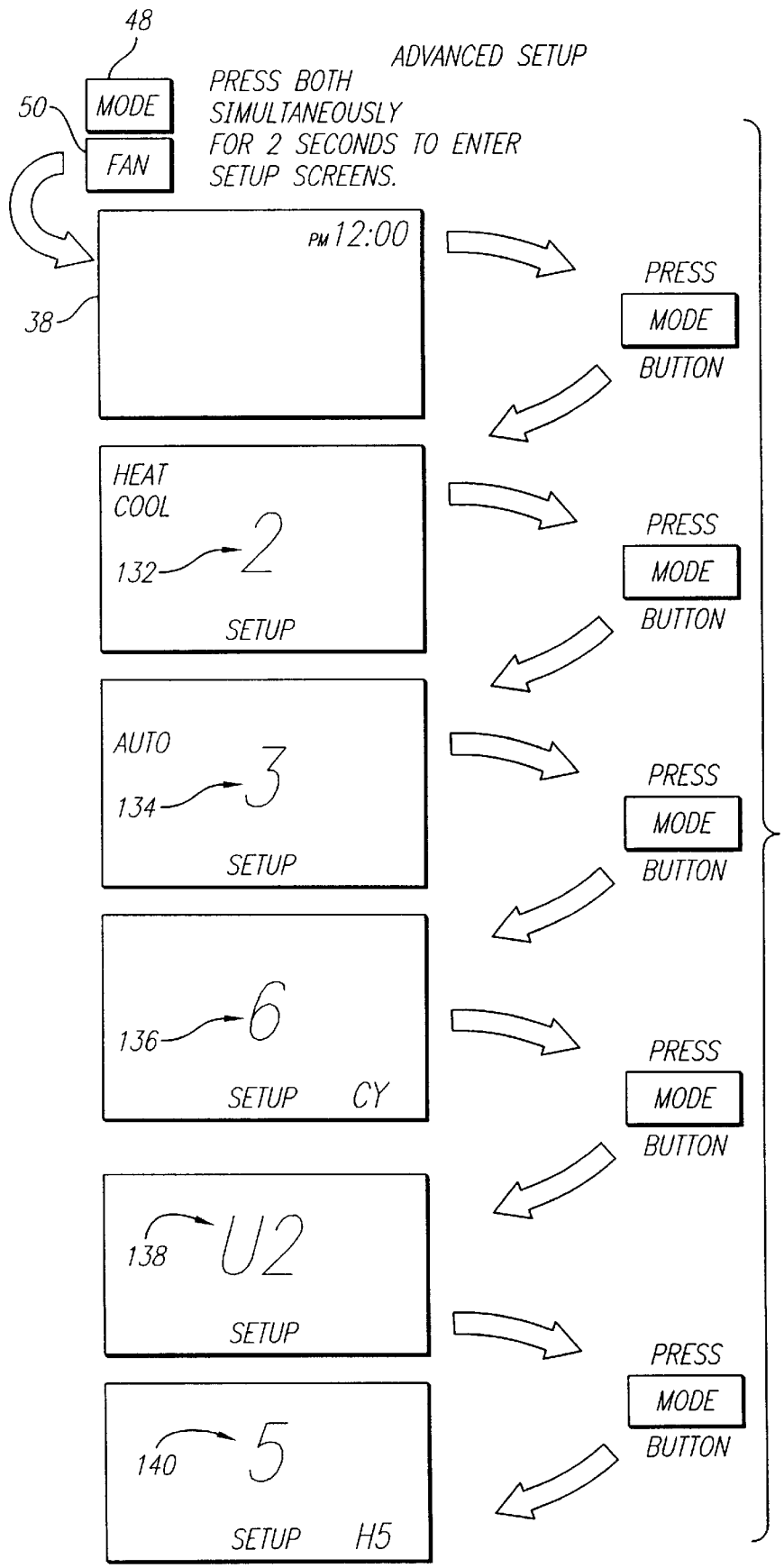
FIG. 9 shows the display portion of the transmitter unit during execution of an advanced programming setup software module.

FIG. 9 shows the display 38 of the transmitter unit 24 during execution of an advanced programming setup software module by the microprocessor 54. A user initiates execution of the advanced programming setup software module by simultaneously pressing the mode button 48 and the fan button 50. First, the user is given an opportunity to adjust the time which is shown in the clock display field 114 by pressing the up and down buttons 44, 46. The selected time (and all of the below described user inputs) are entered by pressing the mode button 48.

After the selected time is entered, the advanced programming setup software module provides control signals to the display 38 to present the user with an interactive display including a manual mode temperature swing display field 132. The manual mode temperature swing is the difference in temperature the room has to be from the desired set temperature to turn on heat or cool when the system 20 is operating in the HEAT or COOL manual operating modes, respectively. For example, a setting of "2" will not allow the heat to turn on until the room temperature is 2 degrees colder than the desired set temperature. Although an exemplary default manual mode temperature swing is 2 degrees (i.e., factory setting), this can be adjusted by employing the up and down buttons 44, 46. An exemplary range of temperature swing adjustment for the manual mode is 1–6 degrees, adjustable in one degree increments. Other ranges and increments of temperature swing adjustment can be employed. Furthermore, it is contemplated that separate temperature swings could be provided for each of the manual modes.

After the temperature swing for the manual mode is entered, the advanced programming setup software module provides control signals to the display 38 to present the user with an interactive display including an automatic mode temperature swing display field 134. The automatic mode temperature swing is the difference in temperature the room has to be from the desired set temperature to turn on heat or cool, depending upon which is needed, when the system 20 is operating in the AUTO operating mode. As shown in FIG. 9, an exemplary default automatic mode temperature swing is "3". A preferred range of temperature swing adjustment for the automatic mode is also 1–6 degrees, adjustable in one degree increments.

After the temperature swing for the automatic mode is entered, the advanced programming setup software module provides control signals to the display 38 to present the user with an interactive display including a heating cycles per hour display field 136. The number of heating cycles entered limits the heater's on/off cycles per hour. As shown in FIG. 9, an exemplary default maximum number of heating cycles per hour is "6". A preferred range of adjustment for the maximum number of cycles per hour is 2–6 cycles, adjustable in one cycle increments.

After the number of heating cycles per hour is entered, the advanced programming setup software module provides control signals to the display 38 to present the user with interactive displays including a transmitter unit identification (ID) display field 138 and a house number display field 140. The transmitter unit ID and house number are likewise adjustable by pressing the up and down buttons 44, 46. To return to normal operation, the user presses the mode button 48 and the fan button 50 simultaneously for a predetermined period of time.

Figure 10B:
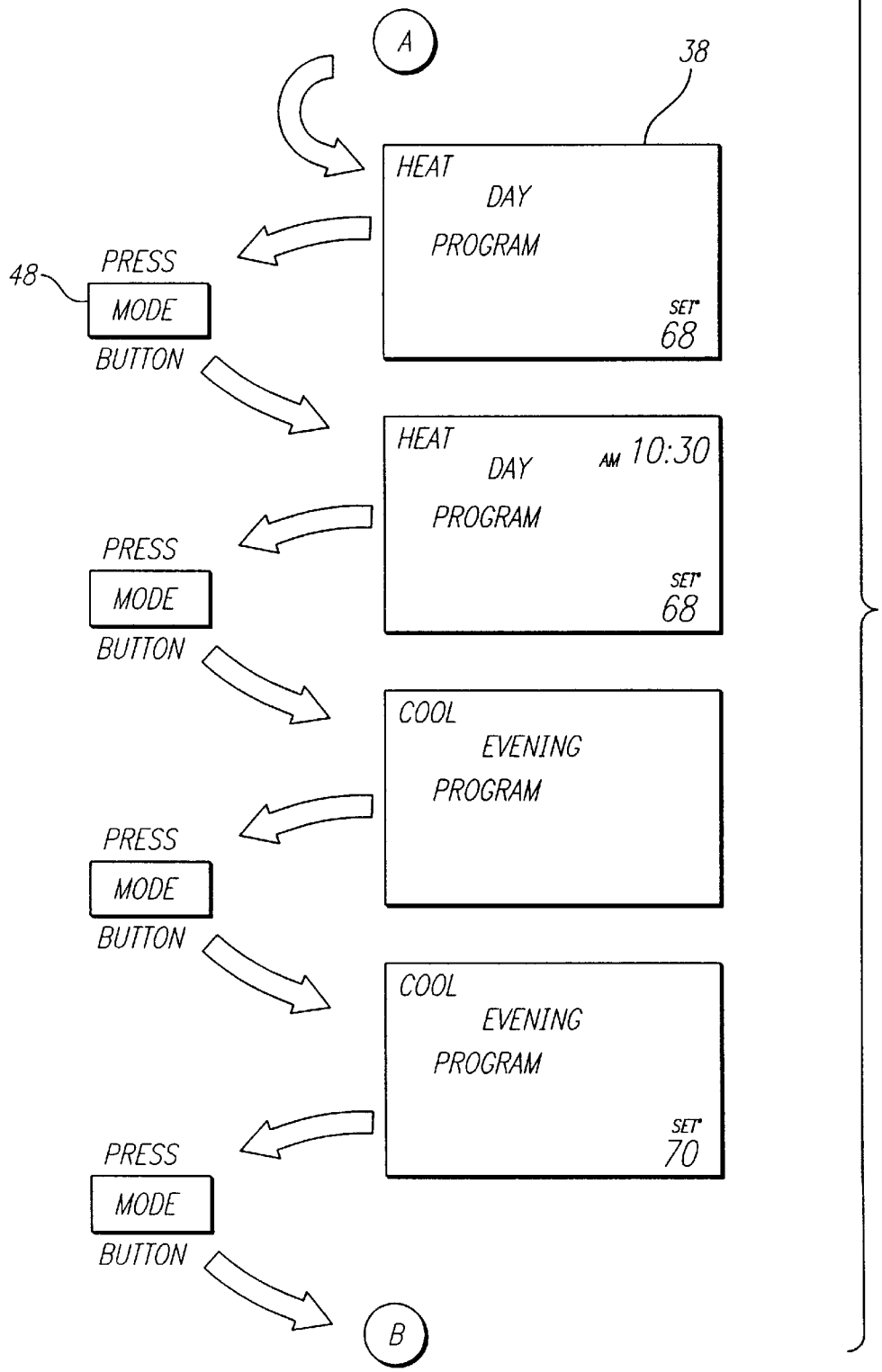
Figure 10C:
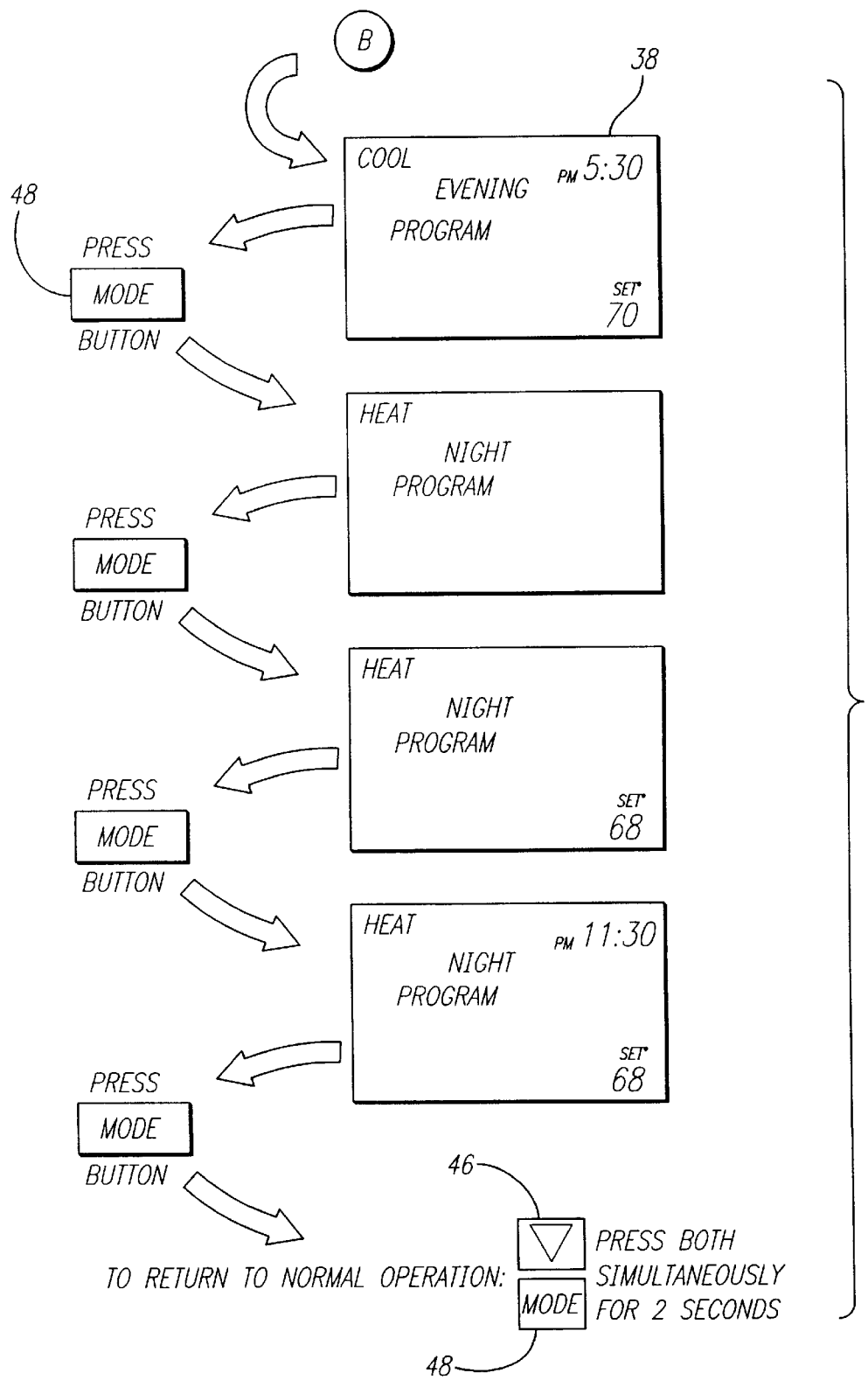

FIGS. 10A–10C show the display 38 of the transmitter unit 24 during execution of an advanced programming mode software module by the microprocessor 54. The advanced programming mode offers a user friendly, interactive display which serves to simplify an otherwise potentially confusing programming task. More specifically, the advanced programming mode provides a "multiple time period" programming feature. In the illustrated exemplary embodiment, the multiple time periods comprise morning, day, evening and night. Sub-fields of the timer period indication display field 128 are selectively activated depending which step of the advanced programming mode software module is currently being executed.

Referring to FIG. 10A, the up and down buttons 44, 46 are first employed by the user to select between one of the HEAT and COOL operating modes for use during the morning time period. The HEAT operating mode is shown as selected by illumination of the HEAT sub-field within the mode indication display field 110. After the operating mode is entered for the morning time period, the advanced programming mode software module provides control signals to the display 38 to present the user with interactive displays which show a morning set temperature within the desired set temperature display field 120 and a morning start time within the clock display field 114. The user adjusts the morning set temperature and the morning start time as desired. Operating modes, set temperatures and start times for the day, evening and night time periods are thereafter entered by the user in response to substantially identical sequences of user prompts provided at the display 38. To return to normal operation, the user presses the down button 46 and the mode button 48 simultaneously for a predetermined period of time.

The microprocessor 54 of the receiver/controller unit 22 generates and manipulates a variety of control variables associated with each of the programming modes and, preferably, is programmed to facilitate automatic adjustments in the control variables as appropriate. For example, various timers are implemented to generate the control signals while the thermostat system 20 is operating in the AUTO operating mode. Also, control variables relating to a desired operating mode need to be periodically updated when time period programming has been activated.

By way of example and not of limitation, the transmitters and receivers each weigh only a few ounces, and less than a pound, and may have dimensions such as 5 inches by 3 inches by 1½ inches or less.

In conclusion, it is to be understood that the foregoing detailed description and the accompanying drawings illustrate the principles of the invention. However, various changes and modifications may be employed without departing from the spirit and scope of the invention. Thus, by way of example and not of limitation, the receiver/controller electronics 28 could be modified to receive input signals from more distant sources employing telephonic communications links or the like. Accordingly, the present invention is not limited to the specific form shown in the drawings and described in detail hereinabove.

What is claimed is:

1. A wireless programmable digital thermostat system comprising:

a plurality of portable, hand-held transmitter units adapted to transmit input signals over a wireless communication medium, each of the transmitters including a user input mechanism adapted to receive programming inputs from users of the transmitter units, each of the transmitters being adapted to generated the input signals in response to the programming inputs, each of the transmitters further including a display adapted to display indicia of the programming inputs; and a receiver unit for a thermostat system which includes a plurality of environmental control apparatuses, the receiver unit including a controller adapted to be programmable in response to the input signals according to a plurality of programming modes and to generate and provide control signals to the environmental control apparatuses, the controller being adapted to facilitate automatic adjustments in control variables associated with at least one of the programming modes, the controller being adapted to process the input signals to identify a transmitter unit which has most recently received a programming input and to control the thermostat system only in response to input signals received from the transmitter unit which has most recently received a programming input.

2. A wireless programmable digital thermostat system comprising:

a controller unit for a thermostat system, the controller unit being adapted to be remotely programmable according to a plurality of programming modes of varying complexity; and a mode override mechanism adapted to provide a mode override signal to the controller unit;

wherein the controller unit is adapted to operate pursuant to control variables associated with one of the programming modes as determined by the mode override signal.

3. The wireless programmable digital thermostat system of claim 2 wherein the plurality of programming modes comprise at least two of a basic programming mode, an economy programming mode, and an advanced programming mode.

4. The wireless programmable digital thermostat system of claim 2 further comprising:

a transmitter unit adapted to transmit input signals over a wireless communication medium;

wherein the controller unit is adapted to receive the input signals and to be remotely programmed in response to the input signals.

5. The wireless programmable digital thermostat system of claim 4 wherein the transmitter unit further includes a user input mechanism adapted to receive programming inputs from a user of the transmitter unit.

6. A wireless programmable digital thermostat system comprising:

a plurality of transmitter units adapted to transmit input signals over a wireless communication medium, each of the transmitter units including a user input mechanism adapted to receive programming inputs from users of the transmitter units, the transmitter units being adapted to generate the input signals in response to the programming inputs; and a receiver unit adapted to receive the input signals (1) to control a thermostat system in response to the input signals from a particular transmitter unit or particular transmitter units, (2) to process the input signals to identify a transmitter unit which has most recently received a programming input, and (3) to control the thermostat system only in response to input signals received from the transmitter unit which has most recently received a programming input;

wherein the receiver unit includes a controller which is adapted to be programmable in response to the input signals according to a plurality of programming modes of varying complexity.

7. A wireless programmable digital thermostat system comprising:

a plurality of portable, hand-held transmitter nits adapted to transmit input signals over a wireless communication medium each of the transmitters including a user input mechanism adapted to receive programming inputs from users of the transmitter units, each of the transmitters being adapted to generate the input signals in response to the programming inputs, each of the transmitters further including a display adapted to display indicia of the programming inputs; and a receiver unit for a thermostat system which includes a plurality of environmental control apparatuses, the receiver unit including a controller adapted to be programmable in response to the input signals according to a plurality of programming modes of varying complexity and to generate and provide control signals to the environmental control apparatuses, the controller being adapted to facilitate automatic adjustments in control variables associated with at least one or the programming modes, the controller being adapted to process the input signals to control the thermostat system in response to input signals from a particular transmitter unit or particular transmitter units.

8. The wireless programmable digital thermostat system of claim 7 wherein the plurality of programming modes comprise a basic programming mode and an advanced programming mode.

9. The wireless programmable digital thermostat system of claim 7 wherein the plurality of programming modes comprise a basic programming mode and an economy programming mode.

10. The wireless programmable digital thermostat system of claim 7 wherein the plurality of environmental control apparatuses comprise an air conditioning unit and a fan.

11. The wireless programmable digital thermostat system of claim 10 wherein the plurality of environmental control apparatuses further comprise a heat pump.

12. The wireless programmable digital thermostat system of claim 7 wherein the controller variables associated with at least one of the programming modes are adjusted by the controller at predetermined times.

* * * * *